Nov. 7, 1961     P. C. COOLIDGE     3,007,611
METERING DISPENSER FOR FLOWABLE MATERIALS
Filed July 9, 1959
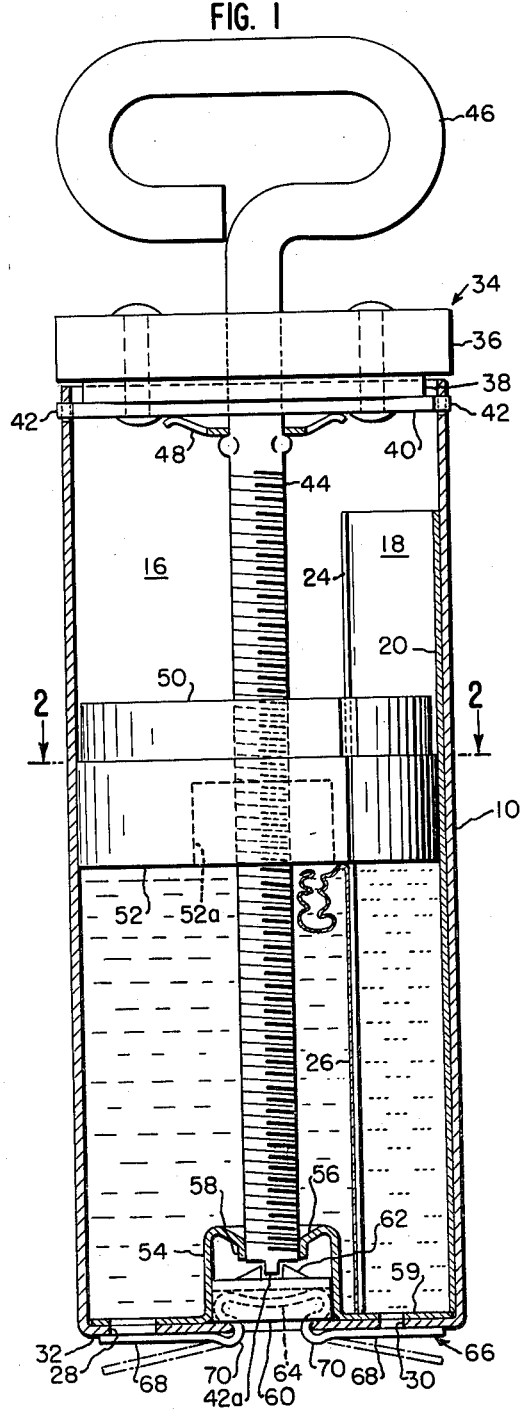
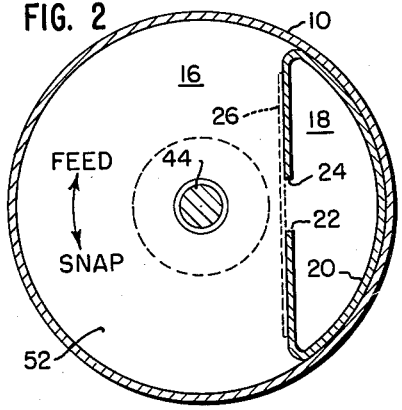
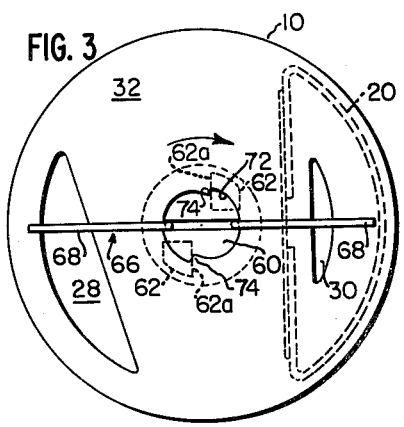
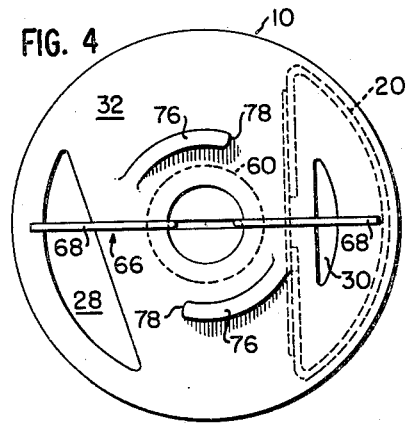
INVENTOR.
PAUL C. COOLIDGE
BY Kenway, Jenney
Witter & Hildreth
ATTORNEYS United States Patent Office 3,007,611
Patented Nov. 7, 1961

3,007,611
METERING DISPENSER FOR FLOWABLE MATERIALS
Paul C. Coolidge, Boston, Mass.
(Jerusalem Road Drive, Cohasset, Mass.)
Filed July 9, 1959, Ser. No. 825,903
13 Claims. (Cl. 222—137)

My invention relates to a novel and improved device for dispensing flowable materials in a controlled manner. More particularly, my invention relates to a novel and improved device for simultaneously and discretely dispensing proportionate amounts of a plurality of flowable materials, as, for example, a resin and a curing agent therefor.

Within recent years a number of products have become available for patching, sealing, cementing and the like which require rather precise ratios of two, or more, different materials to be mixed together at the time they are to be used. In particular, certain plastic resins, of which the epoxy resins are an example, must be mixed with a curing agent or catalyst at the time they are to be used, the ratio of resin to curing agent being important if desirable results are to be obtained. Measurement of the amounts of resin and curing agent using conventional techniques is difficult and time consuming. Additionally, when small amounts of resin and curing agent are to be used, measurements of these small amounts may be difficult and imprecise.

To overcome these problems, dispensers for resin and catalyst have been developed. In general these dispensers comprise either two separate tubes containing the materials mounted in a frame with a plunger in each tube. The plungers are connected and driven by a common driving means down each separate tube, the cross-sectional areas of the tubes and the orifices in their ends being proportioned in the same ratio as the desired proportions of the materials. These devices have not generally been satisfactory because the general scheme required an unwieldy and cumbersome construction. Attempts have also been made to utilize coaxial cylinders of appropriate area, but again, the problem of providing a pair of plungers both of which must be driven simultaneously has produced an expensive and somewhat impractical construction.

Another problem with certain of the dispensers for resins previously available is that even after the resin and catalyst curing agent are extruded from the dispenser, they are sufficiently sticky that they must be cut loose from the dispenser with a knife or the like. However, some of the resins even adhere to the knife. For these reasons, the dispensers heretofore available for the dispensing of resins and curing agents have in general been neither economical of manufacture, of a convenient size, nor convenient to use.

It is a principal object of my invention to provide an improved dispenser of the type described which overcomes the problems heretofore mentioned.

Another object of my invention is to provide a metering dispenser for flowable materials which provides for accurate control of the quantity of materials dispensed, particularly where it is desired to discretely dispense a plurality of paste or viscous liquid materials in predetermined volumetric ratios.

It is a further object of my invention to provide a novel and improved metering dispenser of the type described having improved means for loading the dispenser which facilitates reloading and which improves the over-all economy of use of the dispenser.

Other objects and advantages of my invention will in part be obvious and will in part be apparent from a consideration of the following description of a preferred embodiment of my invention taken in connection with the accompanying drawings, in which:

FIG. 1 is a longitudinal cross-sectional view of a metering dispenser constructed in accordance with my invention;

FIG. 2 is a cross-sectional view taken substantially along the line 2—2 of FIG. 1;

FIG. 3 is a bottom end view of the dispenser of FIG. 1; and

FIG. 4 is a bottom end view of a dispenser such as shown in FIG. 1 but incorporating an alternative form of one aspect of the invention.

In general, in metering dispensers made according to my invention, I provide a hollow tube or cylinder whose cross-sectional area is divided by a longitudinal partition into two or more compartments. The cross-sectional areas of the compartments are proportioned according to the ratio of the materials it is desired to dispense simultaneously. The partition does not extend completely across the cylinder or tube. Rather, a longitudinal slot is provided in its center which extends along its length. This slot is closed with a scissible sealing material which keeps the materials in the compartments separated from each other while stored in the dispenser. A single plunger is provided which is slotted to slide over the non-scissible portion of the partition. Means are provided for driving this plunger along the axis of the tube or cylinder, thus forcing the material in the two compartments out of suitably disposed apertures in the bottom of the compartments. In so doing, the portion of the plunger which is not slotted tears the separating seal. However, the material below the plunger remains separated by the untorn portion. With this construction, metering dispensers for two or more fluid materials are considerably simpler in construction than those previously made. Additionally, the shape of the housing is in no way restricted.

Additionally, I provide positive means for cutting off the extruded materials from the dispenser which is simple in construction and conveniently operable by the use of the same handle that is used to drive the plunger.

More particularly, with reference to FIGS. 1, 2 and 3, a metering dispenser constructed in accordance with my invention comprises an elongated hollow member or housing 10 which in the specific embodiment is formed by a drawn cylindrical metal tube or shell closed at one end. As shown in FIGS. 1 and 2, the interior of the shell 10 is divided into two compartments 16 and 18 by a divider 20 including a wall or partition 22 extending across a chord or the cross section and parallel to the axis of the tube 10. As best shown in FIG. 2, the wall 22 is slotted along its longitudinal centerline to provide a pair of walls extending laterally inwardly of the housing 10 with their inner longitudinal edges spaced apart and defining the slot 24. When the unit is assembled, the slot 24 is covered by a layer of metal foil 26 or other suitable scissible material which is secured to the wall 22 to seal the chambers or compartments 16 and 18 from each other. In this manner, materials may be separately stored in the compartments where they will be out of contact with each other until it is desired to mix them. It will, of course, be understood that the invention is not limited to a dispenser using only a pair of compartments but also includes dispensers having more than two compartments. The cross-sectional areas of the compartments 16 and 18 are selected to be proportional to the volumetric ratio in which it is desired to dispense the materials stored therein.

The compartments 16 and 18 will be in registry with a pair of openings 28 and 30, respectively, in the bottom end wall 32 of the shell. While the end wall 32 is shown as being integral with the shell 10, it is, of course, to be understood that this end wall may be a separate member suitably secured to the shell. The upper end of the shell 10 is closed by a snap-on end cap 34 including a solid cylindrical plastic member or cap 36 having an axial projection 38 of reduced diameter which is received in radially spaced relation within the shell 10. A sheet metal strip 40 is secured to the cap 36 on the bottom of the projection 38 and extends diametrically across the cap. The strip 40 is provided at its opposite ends with a pair of lugs 42 which engage in apertures in the side wall of the shell 10 to secure the cap on the upper end of the shell and to lock the cap against rotation. In order to remove the cap from the shell, the shell is deformed by squeezing it in a direction at right angles to the plane of the accompanying drawing, which bulges the shell in the area of the lugs 42 and causes disengagement of the lugs and apertures.

A threaded drive shaft or jack screw 44 extends through the cap 34 and is rotatable therein and coaxial therewith. The outer end of the jack screw is provided with a handle 46 for manually turning the screw. A resilient thrust washer 48 is held between the underside of the cap 34 and radial projections on the jack screw. The jack screw extends coaxially of and within the shell 10 and threadably engages a drive member or disc 50 received coaxially within the shell 10. The jack screw also extends coaxially and rotatably through a plastic plunger or disc 52. The disc 52 is of the same diameter as the shell 10 and is located between the underside of the drive disc 50 and the material within the compartments 16 and 18.

As is clearly shown in FIG. 2, the plunger or disc 52 is provided with a pair of longitudinally aligned slots extending generally across a chord of the plunger to divide it into a pair of portions respectively complementary to the cross section of the compartments 16 and 18. The spaced-apart portions of the split wall 22 of the divider 20 are slidably receivable in the slots in the plunger, as clearly shown in FIG. 2. The drive disc 50 is likewise provided with similar slots slidably receiving the spaced-apart portions of the divider wall 22. The drive disc 50 and plunger 52 are thus guided for movement longitudinally of the shell and prevented from rotating about the axis of the jack screw by their engagement with the slotted divider wall 22.

Accordingly, during rotation of the jack screw in a clockwise direction, as viewed in FIG. 2, the drive disc 50 is forced toward the lower end of the shell opposite the cap 34 and will carry with it the plunger 52. The chordwise slots in the plunger 52 are separated by a relatively narrow strip joining the sections of the plunger respectively received in the compartments 16 and 18. As this strip extends through the slot 24 on the wall 22, when the plunger is moved toward the lower end of the disc this portion of the plunger tears the foil 26 sealing the compartments 16 and 18. In this connection, the foil is preferably creased along the longitudinal centerline of the slot 24 in order to facilitate tearing of the foil by the downward movement of the plunger.

The lower end of the jack screw 44 opposite the handle 46 is laterally and rotatably supported by a sheet metal support or boss 54 in the form of an inverted cup-shaped member having a central aperture in its base 56. The lower end of the jack screw forces through the opening 56 and an internal coaxial lip or flange 58 on the base laterally supports its lower end. The support 54 is formed integrally with a disc 59 received coaxially within the lower end of the shell 10 in overlying engagement with the end wall 32 of the shell. The disc 58 is provided with a pair of apertures corresponding in shape and size to the apertures 28 and 30 of the end wall 32, and the disc is secured to the shell with its apertures in alignment with the apertures 28 and 30.

A cylindrical clutch element 60 is coaxially and rotatably received within the boss 54 and is retained therein by the end wall 32. The clutch element, as shown in FIGS. 1 and 3, is provided with a pair of inclined wedge-like lugs 62 having a triangular cross section and disposed generally on opposite sides of the axis of the clutch element. The flat faces 62a of the lugs are offset relative to each other and longitudinally of the lugs for the reception of a spade-like projection or tongue 42a formed on the bottom end of the jack screw. As will be apparent from FIGS. 1 and 3, as the jack screw is rotated in a clockwise direction, as viewed in FIG. 2, the spade-like projection will ride up the inclined faces of the lugs 62 and cam the jack screw toward the upper end of the shell 10 as permitted by deformation of the thrust washer 48. However, there will be no driving connection between the jack screw and clutch element 60 to rotate it. On the other hand, during rotation of the jack screw in a counterclockwise direction, as viewed in FIG. 2, the spade-like projection on the jack screw will engage the flat vertical faces 62a of the lugs 62 to rotate the clutch element 60. Accordingly, it is seen that there is provided a one-way driving connection between the jack screw and clutch element 60.

The clutch element 60 is provided with a slot or groove extending across a diameter in its underside. The center bight portion 64 of a whisker or guillotine wire 66 is received in this slot. The guillotine wire 66 comprises a pair of generally axially aligned and axially spaced arms 68 connected at their adjacent ends by the bight portion 64 which is necked in as at 70. As best shown in FIG. 3, the neck 70 of the guillotine wire is rotatably engaged in an irregularly shaped aperture 72 in the end wall 32. The aperture 72 is shaped such that the distance between opposite points on the bordering edge portion of the aperture, as taken through the center of the aperture, progressively decreases in a clockwise direction (as viewed in FIG. 3) from the radial shoulders 74 formed in the edge portion of the aperture until the shoulders 74 are again reached, at which point the width of the aperture abruptly increases. It should be apparent that as the guillotine wire is rotated in the aperture 72 in a clockwise direction, as viewed in FIG. 3, or counterclockwise direction as viewed in FIG. 2, the bordering edge portion of the aperture 72 will cam the neck of the wire together to cause the arms 68 of the wire to be inclined relative to the end wall 32, as shown in dotted lines in FIG. 1. As the neck of the guillotine member rides over the shoulders 74, the arms 68 will resiliently snap back into engagement with the end wall 32.

An alternative means for deflecting the arms 68 of the guillotine member 66 away from the end wall 32 and then permitting them to snap back into place is shown in FIG. 4. As shown therein, inclined wedge-like members or cams 76 are mounted on the end wall 32 in the path of travel of the arms 68 of the guillotine member. The cams 76 are provided with flat vertical faces 78 facing in a clockwise direction as viewed in FIG. 4 so that rotation of the guillotine member in a counterclockwise direction as viewed in FIG. 4 is limited by engagement of the arms 68 with the flat faces of the cams 76. On the other hand, during rotation of the guillotine member in a clockwise direction as viewed in FIG. 4 or counterclockwise direction as viewed in FIG. 2, the cams 76 will cam the arms 68 outwardly of the end wall 32 until the arms ride over the high end of the cams, whereupon they will snap back onto the end wall. Where the cam means of FIG. 4 are utilized rather than the irregularly shaped aperture of FIG. 3, the aperture in the end wall receiving the neck of the guillotine wire will be regularly shaped, as shown in FIG. 4.

I propose to manufacture my improved dispenser in two subassemblies. The first subassembly will consist of the handle 46 and jack screw 44, the end cap 34 and parts associated therewith, and the drive disc 50. The other subassembly will include the compartmented housing 10 with the materials to be dispensed stored therein, the plunger 52, which initially will be at the upper end of the housing 10, the clutch element 60 and associated parts, and the guillotine wire. In general, the user will initially obtain an assembled unit, and after all the materials are expelled from the second subassembly another full subassembly may be procured.

In assembling the two subassemblies, the jack screw is inserted through the compartment 16 and bottomed on the clutch element 60. The cap 34 is then snapped into place on the upper end of the shell in the manner previously described and the dispenser is ready to use. In order to dispense the material in the compartments 16 and 18, the jack screw is rotated in a clockwise direction as viewed in FIG. 2 to feed the plunger 52 toward the end wall 32 and force the materials through the apertures in the disc 58 and end wall 32. The materials will, of course, be dispensed in a volumetric ratio determined by the ratio of the areas of the compartments 16 and 18. As the plunger 52 moves toward the end wall 32, the foil 26 will be torn, as heretofore described, and the movement of the plunger toward the end wall may be continued until the cartridge is emptied. In order to utilize all of the material in the cartridge, the plunger 52 is preferably provided with a counterbore 52a in its side facing the end wall 32, as shown in FIG. 1, so that the plunger may telescopically move over the boss 54 on the disc 58.

As the jack screw is rotated in a direction to dispense the materials, the one-way driving connection between the shaft and guillotine wire assures that the guillotine member will not be rotated. However, when the desired amount of materials has been dispensed, the jack screw is rotated in the opposite direction to sweep the arms 68 of the guillotine member over the apertures 28 and 30 and cut off the materials from the end wall. If the materials are sticky or gummy, they will adhere to the arms 68. However, rotation of the jack screw causes flexure and subsequent snap back of the arms 68 so as to snap off or disengage any adhering material. In this connection, it is preferred that the guillotine member 66 have a free unstressed configuration such that when the guillotine member is assembled in the aperture in the end wall, the arms 66 will be in a stressed condition when firmly engaging the end wall 32. This will assure clean cutting of the material and separation thereof from the end wall 32 as well as enhance the snap action of the arms 68 to disengage any material adhered thereto.

While the invention has been described in terms of a specific embodiment, it is to be understood that the foregoing description and accompanying drawing are to be taken only in an illustrative sense and not as limiting the invention. The invention is to be limited only by the appended claims, which shall include within their scope all structure which logically falls within the language of these claims.

What I claim as new and desire to secure by Letters Patent of the United States is:

1. In a metering dispenser for flowable materials, an elongated hollow housing, means separating the housing into a plurality of side-by-side compartments extending longitudinally of the housing including a partition extending longitudinally of the housing and having a slot extending longitudinally thereof, a tear seal covering said slot to seal said compartments, the housing having apertures at one end respectively registering with said compartments, a plunger received in said housing adjacent the other end thereof for movement longitudinally thereof toward said one end, said plunger having a plurality of sections respectively complementary to the cross section of said compartments and joined by a portion of the plunger receivable in said slot for movement longitudinally thereof, and means for moving the plunger longitudinally of the housing and toward said one end to force material in said compartments toward said one end of the housing while at the same time said portion of the plunger received in the slot tears said seal.

2. In a metering dispenser for flowable materials, an elongated hollow housing, a partition within the housing extending laterally and longitudinally thereof to divide the housing internally into a pair of compartments, said partition having a slot extending longitudinally thereof, a tear seal covering said slot to seal said compartments, the housing having apertures at one end respectively registering with said compartments, a plunger received in said housing for movement longitudinally thereof and including a pair of sections respectively complementary to the cross section of said compartments and including a portion extending through said slot and joining said sections, a jack screw extending coaxially of the housing, means drivingly connecting the jack screw and plunger to provide for movement of the plunger longitudinally of the housing toward said one end thereof in response to rotation of the jack screw.

3. In a metering dispenser for flowable material, a hollow elongated housing, means dividing the housing into a plurality of compartments extending longitudinally of the housing including a pair of walls extending longitudinally of the housing and laterally inwardly thereof and toward each other, the inner longitudinal edges of the walls being spaced apart to provide a slot extending longitudinally of the housing, a tear seal covering said slot, one end of the housing being provided with apertures respectively registering with said compartments, a plunger received in said housing for movement longitudinally thereof and having a pair of separate slots for respectively receiving said walls to guide the plunger during movement of the same longitudinally of the housing, and means to move the plunger toward said one end of the housing.

4. In a metering dispenser, a hollow elongated housing, means dividing the housing into a plurality of compartments extending longitudinally thereof including a pair of walls extending laterally inwardly of said housing and toward each other, the inner longitudinal edges of said walls being spaced apart to provide a slot extending longitudinally of the housing, a tear seal covering said slot, a plunger received within one end of the housing, means dividing said plunger into a plurality of sections complementary to said compartments including a pair of slots respectively receiving said pair of walls, a removable end closure on said one end of said housing, a jack screw carried by said closure extending longitudinally within the housing, and a drive member threadably engaged with said jack screw and drivingly engaged with said plunger to advance the plunger toward the other end of the housing in response to rotation of the jack screw in one direction, said drive member having a pair of slots respectively receiving said walls to guide said drive member longitudinally of said housing and prevent rotation of the drive member, said other end of the housing being provided with apertures respectively registering with said compartments.

5. In a metering dispenser for flowable materials, an elongated tubular housing, means dividing said housing into a pair of compartments including a wall extending chordally of said housing and provided with a slot extending longitudinally of said housing, a tear seal covering said slot to seal said compartments, a disc-like plunger having a diameter of substantially the same as the inner diameter of said housing received in said housing adjacent one end thereof for movement longitudinally thereof and toward the other end of said housing, said plunger having a pair of chordwise slots receiving the portions of said wall on opposite sides of said slot, a jack screw extending rotatably through said plunger and coaxially of said housing, a drive disc received in said housing between said plunger and said one end of the housing, the drive disc being threadably engaged with said jack screw and having a pair of chordwise slots receiving said portions of said wall, a removable end cap on said one end of the housing, said jack screw extending outwardly of said end cap and being provided with an operating handle at its outer end, and means on the other end of said housing rotatably supporting the inner end of said jack screw, said other end of the housing being provided with a plurality of apertures respectively registering with said compartments.

6. In a metering dispenser for flowable materials, an elongated hollow housing, means separating the housing into a plurality of side-by-side compartments extending longitudinally of the housing including a partition extending longitudinally of the housing and having a slot extending longitudinally thereof, a tear seal covering said slot to seal said compartments, a plunger received in said housing for movement longitudinally thereof and having a plurality of sections respectively complementary to the cross section of said compartments, said sections of the plunger being joined by a portion of the plunger receivable in said slot for movement longitudinally thereof, means carried by the housing to move said plunger longitudinally of the housing toward one end thereof including a rotatable driving member, said one end of the housing being provided with apertures respectively registering with said compartments, a guillotine member rotatably mounted at said one end of the housing and having means for sweeping across said apertures as the guillotine member is rotated, and a one-way driving connection between said guillotine member and drive member constructed to provide for rotation of said guillotine member in response to rotation of said drive member in a direction opposite that corresponding to movement of the plunger toward said one end of the housing.

7. A metering dispenser as described in claim 6 wherein said means for sweeping across said apertures comprises a pair of resilient arms slidably engaged with said one end of the housing, and cam means on said one end of the housing engageable with said guillotine member upon rotation thereof relative to said housing to sequentially move said arms away from said one end of the housing and then to permit said arms to snap back onto said one end of the housing.

8. A metering dispenser as described in claim 7 wherein said cam means are located angularly about the axis of said guillotine member in angularly spaced relation to said apertures so that said arms are initially engaged by the cam means to move the arms away from said one end of the housing subsequent to sweeping of said apertures by said arms and while said arms are out of registry with said apertures.

9. In a metering dispenser for dispensing a plurality of flowable materials in a predetermined volumetric ratio, a housing having a plurality of compartments for carrying flowable materials, one end of the housing having a plurality of apertures respectively registering with said compartments, feed means to simultaneously expel material from said compartments through said apertures including an oppositely rotatable drive member, said feed means being operative to expel material from said compartments in response to rotation of said drive member in one direction, a guillotine member rotatably mounted at said one end of the housing and having means wipingly engageable with the exterior of said one end of the housing to sweep across said apertures and separate flowable material from said one end of the housing as said guillotine member is rotated, and a one-way driving connection between said drive member and guillotine member for rotating said guillotine member in response to rotation of said drive member in the direction opposite said one direction.

10. A metering dispenser as described in claim 9 wherein said means to sweep across said apertures comprises a pair of resilient arms slidably engaged with said one end of the housing, and cam means on said one end of the housing engageable with said guillotine member upon rotation thereof relative to said housing to sequentially move said arms away from said one end of the housing and then to permit said arms to snap back onto said one end of the housing.

11. A metering dispenser as described in claim 10 wherein said cam means are located angularly about the axis of said guillotine member in angularly spaced relation to said apertures so that said arms are initially engaged by said cam means to move the arms away from said one end of the housing subsequent to sweeping of said apertures by said arms and while said arms are out of registry with said apertures.

12. In a metering dispenser for dispensing a plurality of flowable materials in a predetermined volumetric ratio, a housing having a plurality of compartments for carrying flowable materials, one end of the housing having a plurality of apertures respectively registering with said compartments, feed means to simultaneously expel material from said compartments through said apertures including an oppositely rotatable drive member, said feed means being operative to expel material from said compartments in response to rotation of said drive member in one direction, a guillotine member at said one end of the housing and comprising a pair of resilient wire arms resiliently and wipingly engaging the exterior of said one end of the housing for sweeping across said apertures, said arms being connected by a bight portion extending through an opening in said one end of the housing, said bight portion being necked in adjacent the junctures between the bight portion and arms with the necked portion of the bight portion rotatably engaging the bordering edge portion of said opening, said opening being irregularly shaped with its bordering edge portion being constructed to provide camming surfaces terminating in radial shoulders so that as said guillotine member is rotated in a direction opposite said one direction said neck portion will be cammed together to move said arms away from said one end of the housing until said neck portion rides over said shoulders, said shoulders being respectively located angularly adjacent one end of said apertures in said one end of the housing, and a one-way driving connection between said drive member and guillotine member for rotating said guillotine member in response to rotation of said drive member in said direction opposite said one direction.

13. In a metering dispenser for dispensing a plurality of flowable materials in a predetermined volumetric ratio, a housing having a plurality of compartments for carrying flowable materials, one end of the housing having a plurality of apertures respectively registering with said compartments, feed means to simultaneously expel material from said compartments through said apertures including an oppositely rotatable drive member, said feed means being operative to expel material from said compartments in response to rotation of said drive member in one direction, a guillotine member rotatably mounted at said one end of the housing and comprising a pair of resilient wire arms resiliently and wipingly engaging the exterior of said one end of the housing for sweeping across said apertures, said arms being connected by a bight portion extending through an opening in said one end of the housing, a plurality of inclined cam surfaces in said one end of the housing in the path of movement of said arms, said cam surfaces terminating at the high ends in vertical faces disposed angularly of the rotational axis of said guillotine member so that said arms will ride over the high ends of said cam and sweep back onto said one end of the housing subsequent to the sweeping of the arms over said apertures, said cams being inclined upwardly in a direction corresponding to movement of said drive member in a direction opposite said one direction, and a one-way driving connection between said drive member and guillotine member for rotating the guillotine member in response to rotation of said drive member in said direction opposite said one direction.

References Cited in the file of this patent

UNITED STATES PATENTS 2,826,339    Maillard _____ Mar. 11, 1958

FOREIGN PATENTS 560,891    Canada _____ July 29, 1958